(12) United States Patent
Mantha et al.

(10) Patent No.: US 7,529,209 B2
(45) Date of Patent: May 5, 2009

(54) SYSTEM AND METHOD FOR MITIGATING FADING OF A SIGNAL AT A RADIO RECEIVER

(75) Inventors: Ramesh Mantha, Toronto (CA); Jeffrey P. Castura, Ottawa (CA)

(73) Assignee: SOMA Networks, Inc., San Francisco, CA (US)

( * ) Notice: Subject to any disclaimer, the term of this patent is extended or adjusted under 35 U.S.C. 154(b) by 900 days.

(21) Appl. No.: 10/494,315

(22) PCT Filed: Oct. 31, 2002

(86) PCT No.: PCT/CA02/01637

§ 371 (c)(1),
(2), (4) Date: Sep. 10, 2004

(87) PCT Pub. No.: WO03/039032

PCT Pub. Date: May 8, 2003

(65) Prior Publication Data

US 2005/0018634 A1 Jan. 27, 2005

(30) Foreign Application Priority Data

Nov. 2, 2001 (CA) .................................... 2361186

(51) Int. Cl.
*H04Q 7/00* (2006.01)
(52) U.S. Cl. ........................ 370/334; 370/321; 370/336; 370/252; 455/101; 455/103; 455/82; 455/132; 455/269; 455/562.1; 455/74; 455/77
(58) Field of Classification Search ................. 370/321, 370/334, 336, 252; 455/101, 103, 74, 77, 455/82, 132, 269, 562.1
See application file for complete search history.

(56) References Cited

U.S. PATENT DOCUMENTS

| 5,303,396 A | | 4/1994 | Hotta et al. | |
| 5,507,035 A | * | 4/1996 | Bantz et al. | .................. 455/133 |

(Continued)

FOREIGN PATENT DOCUMENTS

JP  06-188793 A  7/1994

(Continued)

OTHER PUBLICATIONS

Notice of Reasons for Rejection for Japanese Patent Application No. 2003-541169.

*Primary Examiner*—David Q Nguyen
(74) *Attorney, Agent, or Firm*—Katten Muchin Rosenman LLP

(57) ABSTRACT

The present invention provides a method and system for mitigating fading and/or poor reception at a receiver. The receiver includes configurations each of which can provide different reception characteristics. The receiver evaluates the reception quality of the radio signal with the antenna in a first configuration and with the antenna in at least a second configuration and selects the antenna configuration that has the best evaluated reception for use until a subsequent iteration, when the process is repeated. The antenna configurations can correspond to configurations wherein reception is favored in different directions or to configurations wherein different antennas are selected, each antenna being spaced from each other antenna. The method can also improve the reception of a signal transmitted by selecting an antenna configuration for transmissions which provides improved reception quality at the destination receiver.

8 Claims, 6 Drawing Sheets

U.S. PATENT DOCUMENTS 5,603,107 A * 2/1997 Gottfried et al. ............ 455/133
6,002,672 A    12/1999 Todd
6,115,367 A    9/2000 Gaglione et al.

FOREIGN PATENT DOCUMENTS

| JP | 07-162350 A | 6/1995 |
| JP | 08-256162 A | 10/1996 |
| JP | 09-214409 A | 8/1997 |
| JP | 10-256971 A | 9/1998 |
| JP | 11-234183 A | 8/1999 |
| JP | 2001-186067 A | 6/2001 |
| JP | 2001-244861 A | 9/2001 |
| WO | WO 96/08089 | 3/1996 |

* cited by examiner

SYSTEM AND METHOD FOR MITIGATING FADING OF A SIGNAL AT A RADIO RECEIVER

This application is a 371 of PCT/CA02/01637, filed Oct. 31, 2002 (designating the U.S.; and which published in English in WO 03/039032 on May 8, 2003), which claims the benefit of Canadian Patent Application No. 2,361,186, Nov. 2, 2001, incorporated herein by reference.

FIELD OF THE INVENTION

The present invention relates to a system and method for mitigating signal fading and/or poor reception experienced at a radio receiver. More specifically, the present invention relates to a system and method to mitigate signal fading and/or poor reception at a receiver by selecting, according to a reception quality, a direction and/or location at which to receive and/or transmit the signal.

BACKGROUND OF THE INVENTION

It is well known that radio signals can suffer from a variety of influences that result in a radio receiver experiencing fading of the received radio signal. For example, a radio signal received at a receiver can be subject to Rayleigh fading, other multi-path, or environmental fading influences.

Rayleigh fading, and other multi-path fading effects, result when multipath versions of a signal destructively interfere to attenuate the signal arriving at a receiver. The fading experienced at a receiver typically is unique to that receiver, as it depends upon the particular multiple paths the signals travel between the transmitter and the receiver. Such fading is a significant problem in communications system, especially mobile systems where movement of the receiver and changes in the environment both contribute to changing multipath signals.

Prior attempts to deal with Rayleigh fading and the like have concentrated on providing redundant information in the signal via error correction coding, symbol repetition and interleaving of transmitted information, to allow a receiver to reconstruct symbols lost during a fade experienced at the receiver. While such techniques allow system designers to provide a selected probability of reception of a signal, this is achieved at a cost of reduced system throughput, as redundant information must be transmitted, reducing the bandwidth utilization efficiency of the transmission.

Various other approaches to dealing with Rayleigh fading and the like have also been proposed. For example, the third generation partnership project ("3GPP"), which is working to develop a next generation wireless communication system, has proposed a "compressed mode" of operation. Specifically, and as described in more detail in the documents available from the web site (www.3gpp.org) of the 3GPP organization, the 3GPP air interface has been defined as a slotted-frame architecture wherein data (voice data and "pure" data such as HTTP or FTP data) is typically transmitted from the base station to receivers in frames of ten millisecond duration and each frame comprises fifteen time slots of data. A receiver experiencing poor reception from a base station, due to a fade, or other factors, can inform the base station that it wishes to enter compressed mode for one or more of the next frames sent to it. Once the transmitter at the base station agrees, the agreed compressed frames are transmitted to the receiver.

Each compressed frame contains some agreed number of empty (i.e.—they do not contain data) slots at the end of the frame. The receiver, knowing that the agreed number of slots will not contain data intended for it, is free during the transmission time of those empty slots to attempt to receive signals from other transmitters, such as the pilot signal broadcast by each other base station, to evaluate the receiver's ability to receive those other transmitters. In other words, transmission of data to the receiver occurs only in a portion of the frame and nothing is transmitted in the balance of the frame when the receiver is not listening to that transmitter.

If the receiver can better receive another transmitter than the transmitter it has been listening to, the receiver can inform the current transmitter that it requires a hand off to the better received transmitter. In this manner, which can be considered a form of transmitter diversity, a receiver experiencing a fade or other poor reception characteristics from one transmitter can switch to another transmitter which it can receive at a better condition.

One problem with the 3GPP compressed mode is that radio transmission capacity is wasted whenever the empty slots are transmitted. It is presently contemplated by 3GPP that typically seven of the fifteen slots in a frame will be empty during compressed mode. Another problem with 3GPP compressed mode is that latency is increased during compressed mode as data which would otherwise be transmitted in the empty slots is delayed until a subsequent frame. Yet another problem with the 3GPP compressed mode is that it requires coordination between the transmitter and the receiver and this adds delay and overhead servicing requirements to the communication system. Thus, there will always be some additional delay in how quickly a receiver can evaluate its reception of other transmitters when it is experiencing a fade, or other poor reception characteristics, from the transmitter it is presently receiving. Also, compressed mode is only employed once poor reception is being experienced and it is not used proactively, to prevent unacceptable reception from occurring, where possible. Finally, 3GPP compressed mode presumes that another transmitter is available in the system and that a hand off of responsibility for the receiver can be achieved between the transmitters.

SUMMARY OF THE INVENTION

It is an object of the present invention to provide a novel system and method to mitigate fading and/or other poor reception characteristics of a radio signal experienced at a receiver which obviates or mitigates at least some of the above-identified disadvantages of the prior art.

According to a first aspect of the present invention, there is provided a method of receiving a radio signal at a receiver, comprising the steps of:

(i) receiving a first portion of the radio signal at the radio receiver through a first selected antenna configuration of an antenna diversity mechanism and evaluating the reception quality of the portion;

(ii) selecting another antenna configuration as a second antenna configuration and receiving a second portion of the radio signal at the radio receiver through the second antenna configuration and evaluating the reception quality of the portion, the second portion being smaller in transmission duration than the first portion;

(iii) repeating steps (i), (ii) and (iii) with the first antenna configuration being the antenna configuration which provided the best reception quality in the previous iteration of the method.

Preferably, there are at least three antenna configurations. Also preferably, the reception quality for each antenna configuration is determined at the start of the method and stored in the receiver. Each time an evaluation of the reception quality of an antenna configuration is determined, the stored value is updated and the second selected configuration in step (ii) is the configuration with the next best stored value.

Also preferably, there are at least three antenna configurations and step (ii) is repeated to receive a portion of the signal for each configuration not used to receive the first portion and the configuration with the evaluated best reception quality is employed on the next iteration to receive the first portion of the signal. Also preferably, the signal is transmitted as a slotted frame and the first portion comprises multiple slots.

Also preferably, the antenna configurations comprise configurations of the antenna diversity mechanism whereby each configuration corresponds to a different favored reception direction. As a preferred alternative, the antenna configurations comprise different antennas, each antenna spaced from each other antenna.

According to another aspect of the present invention, there is provided a method of receiving a radio signal at a receiver, comprising the steps of:

(i) receiving a first portion of the radio signal at the radio receiver with an antenna configured to favor a first selected direction and evaluating the reception quality of the first portion;

(ii) receiving a second portion of the radio signal selecting with the antenna configured to favor a second selected direction and evaluating the reception quality of the second portion, the second portion being smaller in transmission duration than the first portion;

(iii) setting the first selected direction to be the favored direction which provided the best reception quality in the previous iteration of the method and repeating steps (i), (ii) and (iii).

Preferably, the radio signal is divided into at least first, second and third portions, the second and third portions having a transmission duration of less than the first portion and where step (ii) is also performed with the antenna configured to favor a third direction for the third portion of the radio signal.

According to another aspect of the present invention, there is provided a receiver for receiving a radio signal divided into at least a first portion and a second portion, the second portion having a shorter transmission duration than the first portion, the receiver comprising:

an antenna diversity mechanism having at least two antenna configurations;

a controller to select one of the at least two antenna configurations to receive the first portion of the radio signal and to select a second of the at least two antenna configurations to receive the second portion of the radio signal; and a reception quality evaluator to determine the reception quality at which the portions of the radio signal are received, the controller being responsive to the determined reception qualities to select the antenna configuration with the best determined reception quality to be the selected antenna configuration for reception of the first portion of a subsequent radio signal.

Preferably, the antenna diversity mechanism comprises a steerable antenna and each antenna configuration corresponds to the favoring of a direction from which to receive the radio signal. Also preferably, the antenna diversity mechanism has four antenna configurations, each configuration corresponding to a directional quadrant of about ninety degrees from which reception of the radio signal is favored.

According to yet another aspect of the present invention there is provided a wireless telecommunication system, comprising:

a wireless base station for transmitting a radio signal; and a subscriber station for receiving the radio signal divided into at least a first portion and a second portion, the second portion having a shorter transmission duration than the first portion, the subscriber station comprising:

an antenna diversity mechanism having at least two antenna configurations;

a controller to select one of the at least two antenna configurations to receive the first portion of the radio signal and to select a second of the at least two antenna configurations to receive the second portion of the radio signal; and a reception quality evaluator to determine the reception quality at which the portions of the radio signal are received, the controller being responsive to the determined reception qualities to select the antenna configuration with the best determined reception quality to be the selected antenna configuration for reception of the first portion of a subsequent radio signal.

Preferably, the subscriber station is also operable to transmit a radio signal to the base station, the controller further selecting one of the at least two antenna configurations to transmit the radio signal to the base station.

The present invention provides a method and system for mitigating fading and/or poor reception at a receiver. The receiver includes an antenna diversity mechanism which can be operated in a variety of antenna configurations each of which can provide different reception characteristics. The receiver evaluates the reception quality of the radio signal with the antenna in a first configuration and with the antenna in at least a second configuration and selects the antenna configuration that has the best evaluated reception for use until a subsequent iteration when the process is repeated. The antenna configurations can correspond to configurations wherein reception is favored in different directions or to configurations wherein different antennas are selected, each antenna being spaced from each other antenna.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
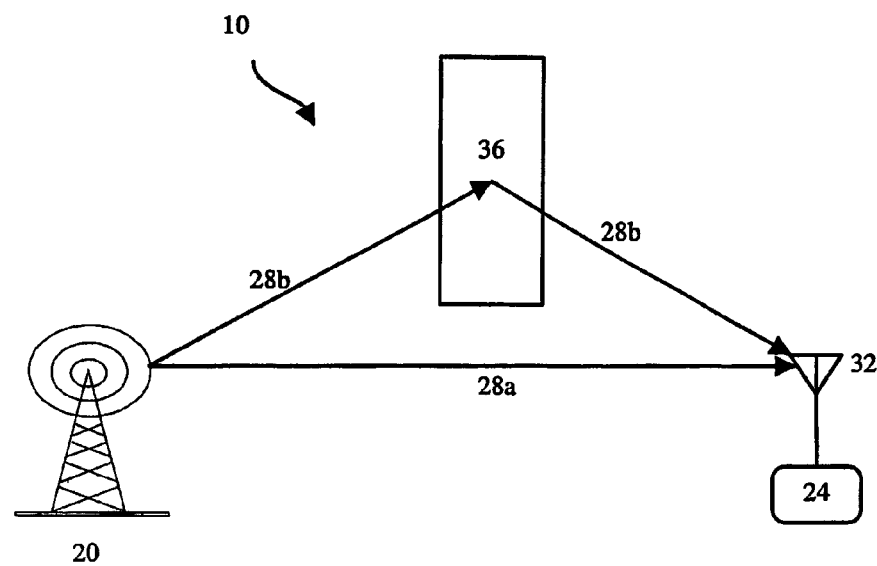
FIG. 1 shows a schematic representation of a pair of transceivers in accordance with an embodiment of the present invention.

FIG. 1 shows a communications network 10, such as a wireless local loop system, including a first transceiver, such as base station 20 and a second transceiver, such as subscriber station 24, which are communicating by a radio signal 28 in accordance with an embodiment of the present invention. As is known, radio signal 28 typically travels over many signal paths 28 (for clarity only two signal paths 28a and 28b are shown in the Figure) before being received at an antenna diversity mechanism of subscriber station 24. As shown in the Figure, signal path 28b is a greater distance, the signal having been reflected off of an object 36 such as a building, than signal path 28a which is a direct path. If the present invention was not employed, a fade could be experienced at subscriber station 24 when the signals arriving over paths 28a and 28b, etc., tend to cancel each other at subscriber station 24 through destructive interference.

Figure 2:
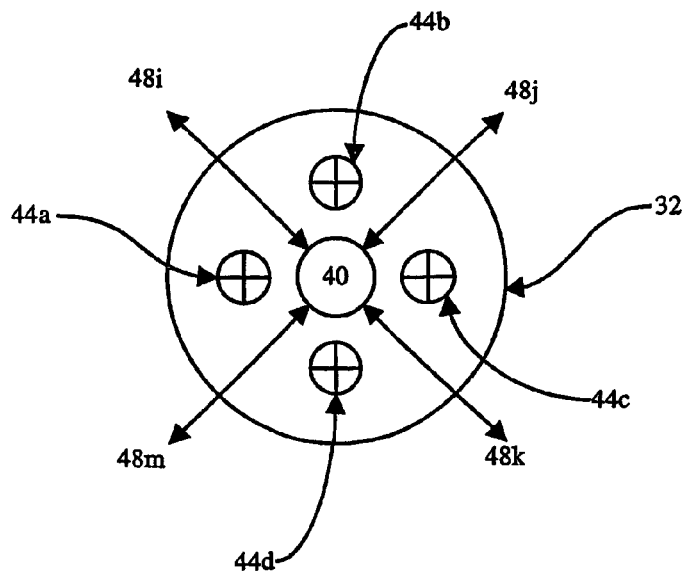
FIG. 2 shows a schematic representation of an antenna diversity mechanism employed in an embodiment of the present invention.

FIG. 2 shows an embodiment of antenna diversity mechanism 32 of subscriber station 24 that uses a steerable antenna 34 in more detail. An example of a suitable steerable antenna 34 can, for example, be similar to that described in U.S. patent application Ser. No. 09/775,510, assigned to the assignee of the present invention and the contents of which are incorporated herein by reference. Another example of a suitable steerable antenna can be similar to that described in U.S. patent application Ser. No. 09/899,927, assigned to the assignee of the present invention and the contents of which are incorporated herein by reference. Both of these antennas allow for the selection between antenna configurations wherein favored direction for reception and/or transmission can be selected, the favored direction being the direction which the antenna is most sensitive in and/or directs the most transmitted power in. Other examples of suitable antenna diversity mechanisms 32, such as the use of multiple antennas, will occur to those of skill in the art.

As shown in the example of FIG. 2, steerable antenna 34 includes an antenna element 40 and four steering elements 44a, 44b, 44c and 44d which can be switched between floating or electrically grounded states to "steer" antenna element 40 to favor reception, and transmission, of radio signals in the general direction of one of four roughly ninety degree sectors 48i, 48j, 48k or 48m and thus steerable antenna 34 has four antenna configurations. As will be apparent to those of skill in the art, steering elements 44 can be switched individually, or in pairs, etc. to yield different characteristics of favored reception and transmission directions. It is also contemplated that greater or fewer than four steering elements 44 can also be employed to achieve favored reception or transmission over greater or lesser directions than roughly ninety degree sectors, if desired. For example, antennas having more steering elements 44 can be employed to provide antenna configurations favoring sectors of six sectors of sixty degrees or eight sectors of forty-five degrees, etc. For reasons of clarity only, the discussion herein refers only to antenna configurations of sectors having transmission and/or reception angle of about ninety degrees, however configurations of sectors of greater angles or lesser angles are intended to be included within the scope of the present invention.

Figure 3:
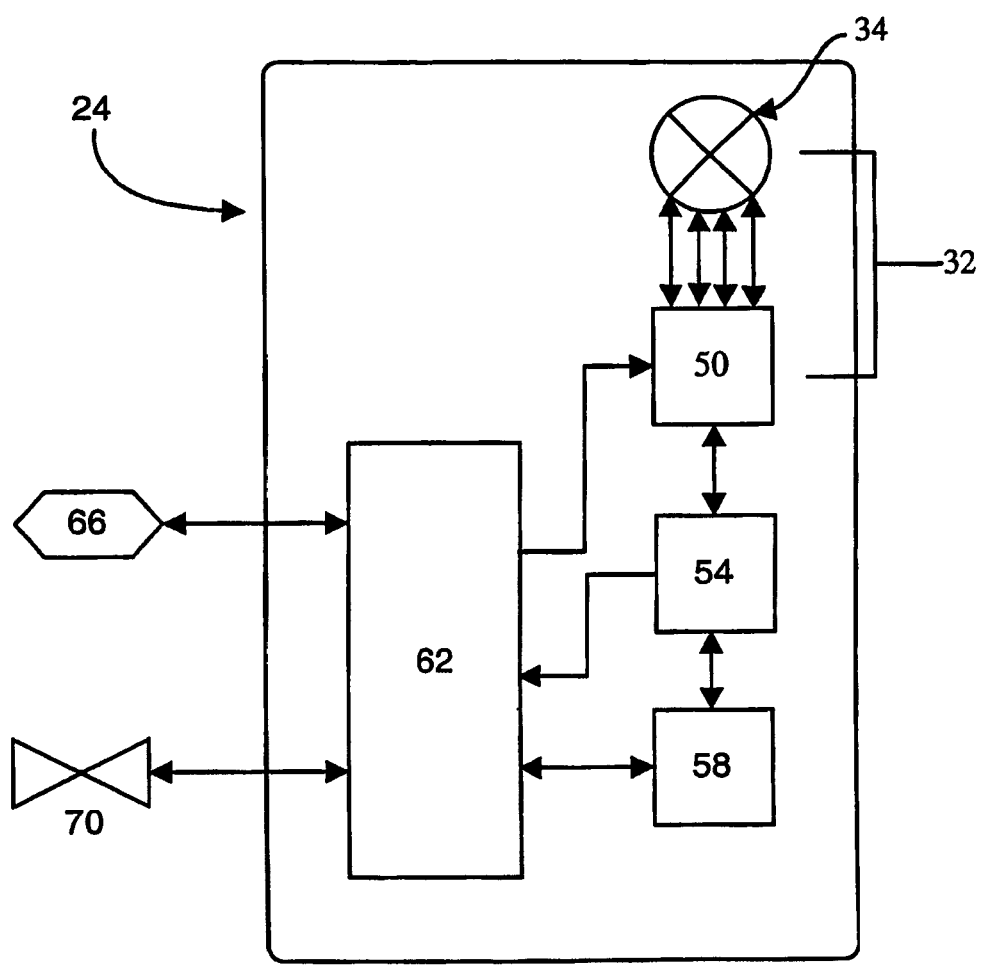
FIG. 3 shows a schematic view of a subscriber station in accordance with an embodiment of the present invention.

Subscriber station 24 is shown in more detail in FIG. 3. As mentioned above, subscriber station 24 includes an antenna diversity mechanism 32 which comprises an electrically steerable antenna 34 and a controller 50 to select between the available antenna configurations. Subscriber station 24 also includes a radio 54 and a modem 58 which, in turn, receive signals over radio link 28 and convert the received signals into data. A processor 62, such as an Intel StrongArm processor, processes the received data and provides it to data devices 66 and/or telephony devices 70 connected to subscriber station 24. Radio 54 includes a reception quality evaluation function which determines an appropriate reception metric, such as a signal to noise ratio, and provides that measurement to processor 62. Processor 62 is operable to respond to this measurement to instruct controller 50 to select an antenna configuration for steerable antenna 34, as described below.

Figure 4A:
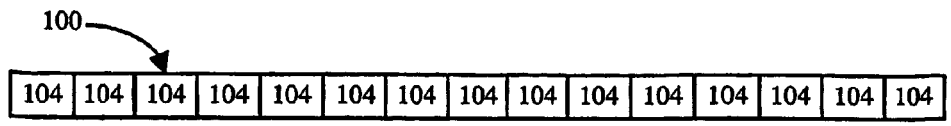
FIGS. 4a, 4b, 4c, 4d and 4e show frame structures of signals.

In a present embodiment of the invention, data is transmitted from base station 20 to subscriber stations 24 in the slotted frame 100 structure, shown in FIG. 4a, which is similar to that proposed by the 3GPP body. As with the 3GPP structure mentioned above, each frame 100 includes fifteen slots 104. In this embodiment, CDMA is employed as a multiple access technique and a chip rate of three-million eight-hundred and forty thousand chips per second is employed. Thus, for frames 100 of ten milliseconds duration, a frame will comprise thirty-eight thousand, four hundred chips, with each slot 104 in frame 100 comprising two-thousand, five-hundred and sixty chips. However, as will be apparent to those of skill in the art, the present invention is not limited to use with such a slotted frame structure and the present invention is compatible with many other transmission structures.

Figure 4B:
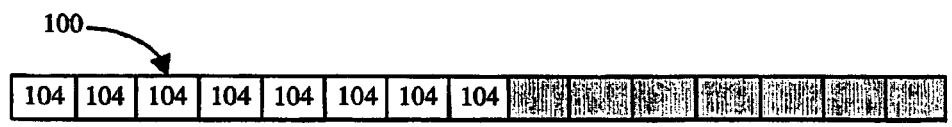

FIG. 4b shows a frame 100 constructed in accordance with the prior art compressed mode proposed by the 3GPP organization, wherein the hatched slots are empty, i.e. —contain no data intended for a receiver, when the transmitter and receiver have agreed to enter compressed mode. During transmission of the empty slots, the receiver can attempt to locate another transmitter which it can receive at a better quality, typically by evaluating the reception quality of the pilot signal transmitted by such other transmitters.

In contrast, in the present invention, subscriber station 24 selects an initial sector 48 from which it can best receive signals from base station 20. This selection will first be performed as part of the normal acquisition process whereby subscriber station 24 determines the base station 20 that it will be serviced from. Essentially, as part of the acquisition process, the reception quality of signals from base station 20 can be determined for each sector 48 and the sector 48 with the best reception quality will be initially selected. Other techniques for selecting an initial sector, including a random selection, can also be employed, as will be apparent to those of skill in the art.

Then, from time to time, subscriber station 24 will determine if it can better receive signals from base station 20 from an alternative sector 48. For example, if subscriber station 24 is receiving a signal from base station 20 from sector 48j at a given signal to noise ration (SNR) or any other appropriate metric of reception quality, subscriber station 24 can at an appropriate time switch to another sector, such as 48k, to determine if it can receive the signal at a better SNR from that direction. If, in this example, sector 48k provides a better SNR than that presently experienced from sector 48j, subscriber station 24 will continue to receive from sector 48k. If sector 48k does not provide a better SNR than sector 48j, subscriber station 24 can either return to receiving from sector 48j or can evaluate reception from other sectors (48i and 48m), as discussed in more detail below.

Most CDMA systems employ a RAKE receiver whose fingers are aligned with the strongest multipath received signals to allow the multipath signals to be combined to achieve a higher SNR than would otherwise be possible. Each finger of a RAKE receiver has a set of parameters determined for it which define the reception characteristics of the multipath version of the signal it is receiving. With the present invention, the values for these parameters are, determined for each sector 48 at start up of subscriber station 24. The parameters for a sector 48 are then updated whenever signals are received from that sector 48 and the latest values for these finger parameters in that sector 48 are stored whenever steerable antenna 34 is switched to another sector 48. If a RAKE receiver is not employed in subscriber station 24, for example if an equalizer is employed instead, the relevant reception parameters for the equalizer for each sector 48 are determined and stored. Thus, subscriber station 24 maintains the last set of reception parameters determined for receiving signals from each of sectors 48*i*, 48*j*, 48*k* and 48*m*.

With the stored parameters, switching of steerable antenna 34 to another sector 48 can be achieved very quickly, for example in a single chip interval. Specifically, the appropriate stored reception parameters can be loaded into the RAKE receiver or equalizer while elements 44 are grounded or floated to switch sectors 48 to receive the signal from the newly selected sector 48. Thus, very rapid evaluations of reception quality from a sector 48 can be performed with the present invention and it is contemplated that evaluations of reception quality in sectors 48 can be performed as needed in slot or even sub-slot intervals.

As rapid (in some cases slot or sub-slot) evaluations of reception quality can be achieved, data can be transmitted by base station 20 in every slot 104 of frame 100 in the present invention, unlike the 3GPP compressed mode. At worst, should subscriber station 24 be receiving a frame 100 and select a different sector 48 with too low a reception quality to accurately receive the contents of a slot 104, the contents of that slot 104 can be lost. However, the error correcting coding and symbol repetition employed for the data transmitted through frame 100 will typically allow recovery and/or reconstruction of a missed slot 104 or other portion of a frame 100. If insufficient error correction and/or repetition is present, subscriber station 24 can request retransmission of the contents of the missing slot 104 or other portion of frame 100. If sub-slot evaluations are employed by subscriber station 24, an even better likelihood of recovery and/or reconstruction of a slot 104 can be achieved.

Figure 4C:
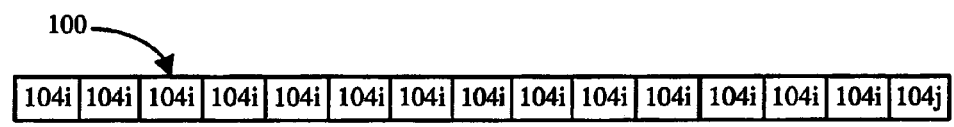

Several different methods of operation are contemplated in the present invention. A first method is to perform a switch to a different sector 48 when receiving the last slot 104 of each frame 100, or of each Xth frame 100, where X can be one to ten, or more. For example, as shown in FIG. 4*c*, subscriber station 24 can be receiving from sector 48*i* for the first fourteen slots 104*i* of frame 100 and a switch of steerable antenna 34 is then performed to receive from another selected sector, such as 48*j*, for the fifteenth slot 104*j*. If the signal from base station 20 is received at subscriber station 24 with at least as good a reception quality from sector 48*j* as from sector 48*i*, reception continues for the next fourteen subsequent slots 104*j* (from the next frame 100 not shown) from sector 48*j*. If the reception of slot 104*j* from sector 48*j* is worse than the reception quality of slots 104*i* from sector 48*i*, reception returns, for the next fourteen subsequent slots 104*i* (from the next frame 100) to sector 48*i*.

In this embodiment, a table of the last experienced reception qualities (LERQ) from each sector 48 is maintained in subscriber station 24 and is updated with this latest information as are the cached reception parameters. The selection of which sector 48 to test at the next interval can be made according to the next highest reception quality level indicated in the LERQ table.

As an example, given the LERQ Table 1 of Appendix A, and with subscriber station 24 receiving via sector 48*i*, sector 48*j* would be tested next. If sector 48*j* is, when tested, received at a lower reception quality than 48*i*, subscriber station 24 switches back to sector 48*i* and updates the LERQ table to the value for 48*j* in Table 2 of Appendix A. Sector 48*m* now has the highest historical reception quality of the three sectors other than 48*i* and will thus be the sector next tested by subscriber station 24. If, when tested, subscriber station 24 has a better reception via sector 48*m*, it continues to receive via that sector and updates the LERQ table to that shown in Table 3 of Appendix A. On the next switch, subscriber station 24 will again consider sector 48*i* as it has the highest historical reception quality. If sector 48*m* has a better reception quality than sector 48*i* which could, for example, be experiencing a fade, reception returns to sector 48*m* and the LERQ table is updated as shown in Table 4 of Appendix A. In this case, at the next switch, sector 48*k* will be tested.

As will be apparent to those of skill in the art, other selection methods than the LERQ table can be employed, in which case the LERQ table can be omitted. For example, it may be that it is commonly the case that if a sector 48 suffers a fade, that the most likely sector with better reception will be one of the sectors that are at ninety degrees to the affected sector. For example, sectors 48*i* and 48*k* may have the best reception at one time, with sector 48*i* being the selected sector, but as the reception quality experienced at sector 48*i* decreases, so does the reception quality which would be experienced at sector 48*k*. Thus, sectors 48*m* and 48*j* should be evaluated and/or employed and one of them will be selected and evaluated.

It may also be the case that no correlation exists between experienced reception qualities prior to a fade and those during a fade. Accordingly, a new sector 48 to be evaluated can be selected randomly and this process can repeat until each sector 48 has been evaluated and the sector 48 yielding the best result is selected.

Figure 5:
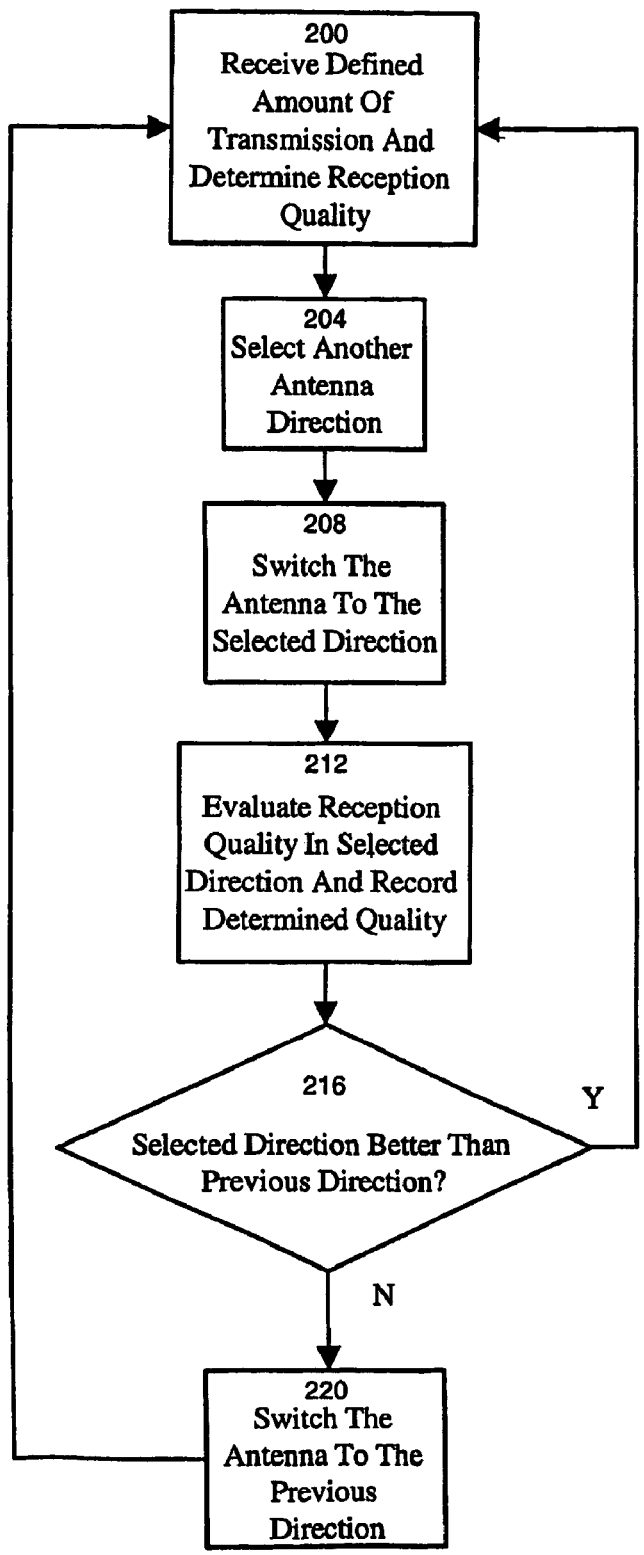
FIG. 5 shows a flowchart of an embodiment of the process of switching the antenna diversity mechanism of FIG. 2 to improve reception quality, in accordance with the present invention.

In any event, the process of switching sectors for reception is illustrated in the flowchart of FIG. 5 wherein at step 200, a predefined portion of a transmitted signal, such as fourteen of fifteen slots 104 of a frame 100, is received and the reception quality determined. As used herein, the tern portion is intended to comprise a time duration of the transmitted signal and can be defined as a time period or as a number of transmitted traffic bits, chips or any other suitable quantum of the transmitted signal. At step 204, an alternative antenna direction is selected, based upon values in the LERQ table or based upon any other suitable criteria, including performing a random selection. At step 208, the antenna is switched to the selected direction and the reception quality is evaluated and determined for a selected portion of the signal, for example one slot. If a LERQ table or other record of received transmission qualities is being employed, this record is updated with the determined reception value.

As-will be apparent to those of skill in the art, at the start up of subscriber station 24, reception is performed in each direction for a time period, such as five frames, which is selected to ensure a good evaluation of reception and/or transmission characteristics and the RAKE receiver, equalizer or other receiver parameters. After this initial characterization/determination is performed, the process of FIG. 5 commences.

At step 216 a determination is made as to whether the direction selected in step 204 provides a better reception quality than the direction employed in step 200. If an improvement has been obtained, the process returns to step 200 and employs the direction selected in step 204. If no improvement was obtained, the process proceeds to switch back to the previous antenna direction at step 220 and then returns to step 204 and the process repeats.

Figure 4D:
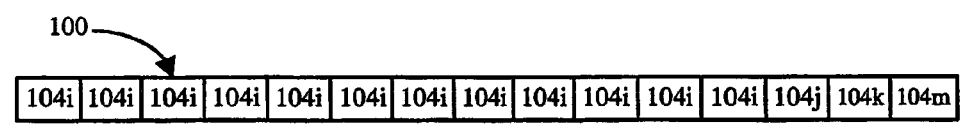

Another technique for managing the present invention is to examine each of the three alternative sectors 48 during reception of a frame 100. In this embodiment, the first twelve slots 104 in each frame 100 can be received via one sector 48i and each of the three other sectors 48j, 48k and 48m will then be tested for a respective one of the three remaining slots 104j, 104k, 104m as shown in FIG. 4d. The sector 48 with the best determined reception quality is selected for reception of the first twelve slots 104 of the next frame 100.

Figure 4E:
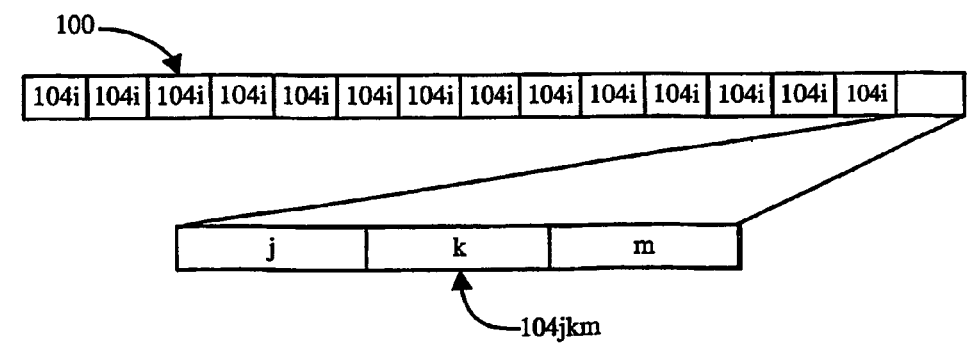

Yet another technique for managing the present invention comprises performing sub-slot testing of the three alternative sectors 48. Thus, the first fourteen slots 104i of a frame 100 are received via one sector 48i and each of the three alternative sectors 48j, 48k and 48m is tested for about one-third each of the fifteenth slot 104jkm of frame 100 as shown in FIG. 4e. Again, the sector 48 with the best reception quality is selected for receiving the first fourteen slots of the next frame 100.

If fading occurs quickly, relative to the duration of frames 100, such as when the receiver or transmitter or both are mobile, sub-slot testing can be employed more than once per frame. For example, four slots 104 can be received from one sector 48 then the other three sectors 48 can be examined for a fifth slot 104 with the sector 48 with the best reception being selected for the next four slots 104 and the process repeated. Thus, the best sector is determined from all sectors 48 three times per frame 100.

As will be apparent, each of the above mentioned operating techniques has a different characteristic in responding to fades or other radio reception factors. For example, relatively slow changes, such as typical Raleigh fading in a fixed wireless circumstance, can be adequately managed by the first mentioned technique while fading in a mobility circumstance may be better dealt with one of the sub-slot sampling techniques.

It is contemplated that the rate at which other directions are evaluated can be varied during operation, depending upon the operating conditions experienced in the network For example, when a subscriber station 24 is employed in a fixed circumstance, i.e. —the subscriber station 24 is not being moved in use, a relatively low rate of evaluations can be employed, such as once every two frames 100, etc. If that subscriber station 24 subsequently is used in a mobile circumstance, i.e. —the subscriber station 24 is used while moving between locations at a relatively rapid rate, system 20 can switch to evaluating directions to and from that subscriber station 24 more frequently, such as once per frame or even more frequently. Thus, some subscriber stations 24 can be evaluating their transmission and/or reception directions at a slow rate while other subscriber stations 24 is system 20 employ a faster or much faster rate of evaluation.

As mentioned above, it is also contemplated that antenna diversity mechanisms with greater or fewer than four configurations can be employed. For example, six sixty-degree sectors can be employed and the above-mentioned processes can be performed to select the one sector of the six with the best reception quality.

In the system and method described above, a simplifying assumption has been made in that transmissions from subscriber station 24 to base station 20 will be transmitted in the same sector 48 from which the best reception of signals from base station 20 has been achieved. As will be apparent to those of skill in the art, this assumption is not necessarily correct as the downlink and uplink transmission paths can differ significantly, at least in frequency division duplexed (FDD) systems. Accordingly, the present invention can also switch sectors 48 for transmitting from subscriber station 24 to a base station 24.

Specifically, if system 10 is a time division duplexed (FDD) system (i.e. —a subscriber station 24 can only either transmit or receive a signal at a given time, over the same frequency) then steerable antenna 34 can be switched to appropriate sectors 48 when receiving, as described above. When transmitting, subscriber station 24 employs the same sector 48 last selected for reception, as the path traveled by the received signal will be the same path traveled by the signal transmitted.

If system 10 is a frequency division duplexed (FDD) system (i.e. —a subscriber station 24 can both receive and transmit signals at the same time, over different frequencies), then the antenna diversity mechanism can comprise two antennas 32 in subscriber station 24, one for transmitting and one for receiving. One of these antennas 32 will evaluate and be switched to the sector 48 with the best reception quality and the other will evaluate and be switched to the sector 48 with the best transmission quality. In the latter case, when transmitting subscriber station 24 employs information sent in the last transmission from base station 20 to subscriber station 24 to select a sector 48 on which to transmit. Specifically, base station 20 will inform subscriber station 24 of the quality at which its last transmission was received at base station 20 (this information can be explicitly provided to subscriber station 24 or can be implicitly derived by subscriber station 24 from power control information or other information sent to the subscriber station 24 from base station 20).

Subscriber station 24 maintains a record of the last transmission reception quality (LTRQ) experienced at base station 20 for each of its sectors 48, as reported by base station 20, and will switch steerable antenna 34 to the sector 48 with the best recorded LTRQ before transmitting. If the base station 20 informs the subscriber station 24 that its transmission reception quality is decreasing, subscriber station 24 will update the recorded quality for that sector 48 in its LTRQ record and will determine which sector 48 now has the best recorded quality and that sector 48 is then selected for the next transmission. Alternatively, subscriber station 24 can transmit from each sector 48 for a portion of a frame 100 and base station 20 will advise the quality with which each corresponding portion was received. Subscriber station 24 will then select the sector which base station 20 received at the best quality for transmitting the bulk of the next frame 100. Thus, subscriber station 24 may receive transmissions from base station 20 from sector 48i and yet transmit to base station 20 through sector 48k, etc.

Figure 6:
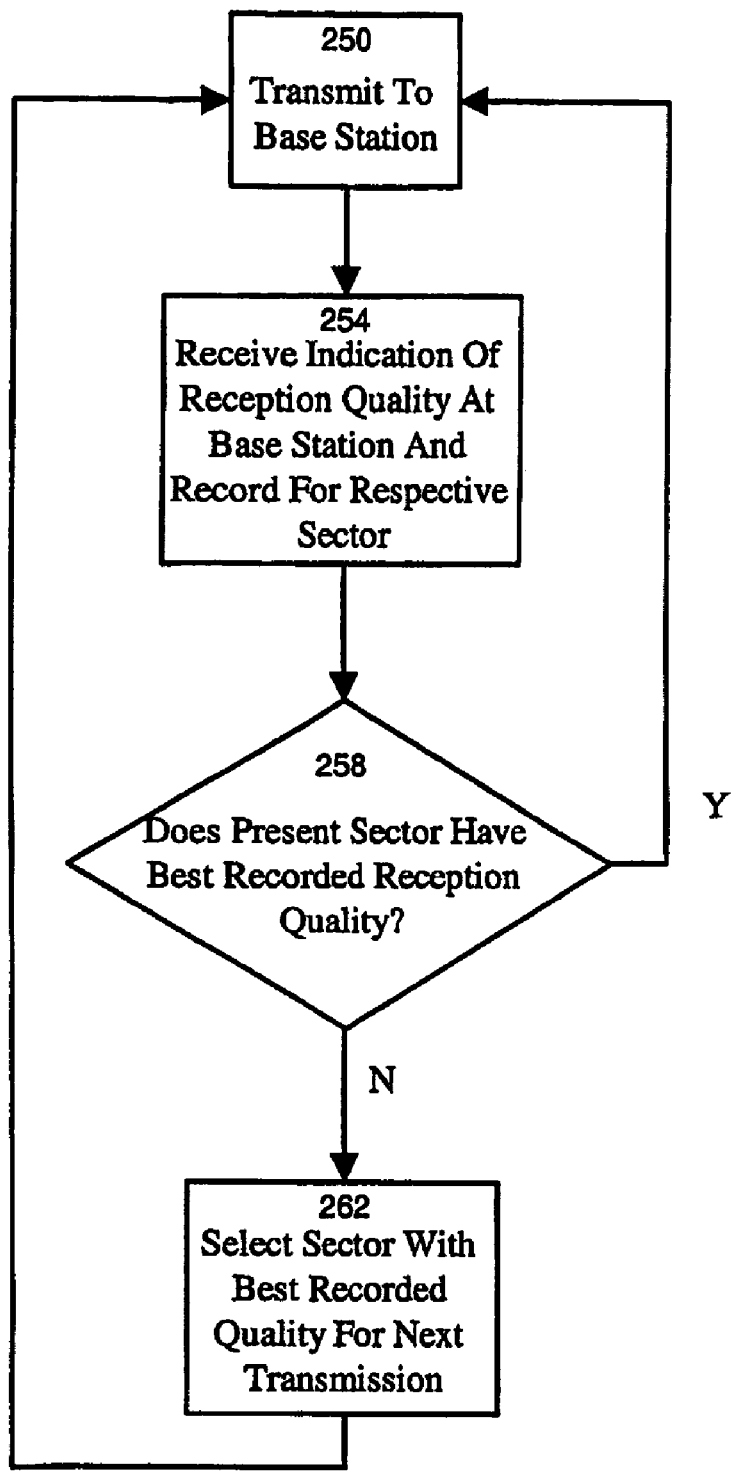
FIG. 6 shows a flowchart of an embodiment of the process of switching the antenna diversity mechanism of FIG. 2 to improve transmission quality, in accordance with the present invention.

In the FDD case, a process for switching sectors 48 for transmission is illustrated in the flowchart of FIG. 6 wherein at step 250 a transmission from subscriber station 24 to base station 20 occurs through a sector 48. As discussed above, this transmission can comprise a portion of a frame, an entire frame or even multiple frames. The base station 20 receives the transmission and determines the transmission reception quality and at step 254, informs subscriber station 24 of the transmission reception quality it experienced and subscriber station 24 makes a record of the transmission reception quality. At step 258 a determination is made as to whether the previous transmission reception quality from any other sector is better than the transmission reception quality of the sector presently employed. If the transmission reception quality from the present sector is at least as good as the transmission reception qualities last recorded for the other sectors, the present sector will be used for the next transmission and the process returns to step 250. If the transmission reception quality is not as good as the transmission reception quality last recorded for any other sector, at step 262 the sector with the best last recorded transmission reception quality is selected for the next transmission and the process returns to step 250.

By proactively switching between sectors 48 wherein an improved reception quality is obtained at the subscriber station 24, transmission power allocated by base station 20 to the transmission to subscriber station 24 can likely be reduced, allowing this power to be assigned to other communications from base station 20. By proactively switching between sectors 48 wherein improved transmission reception is obtained at base station 20, more efficient transmission techniques, such as using less FEC coding or symbol repetition, can be employed to increase throughput from subscriber station 24 to base station 20. Similarly, by switching between sectors 48 to improve reception at base station 20, either less power can be employed for the transmission or more data can be transmitted (higher data rate) for the same power, in both cases improving overall transmission capacity to base station 20 from subscriber stations 24 in system 20.

It is also contemplated that in certain circumstances, a subscriber station 24 will receive signals from a first base station 20 and transmit signals 24 to a second base station 20 (not shown). In such a case, the sector 48 to receive from will be determined relative to first base station 20 and the sector 48 to transmit from will be determined relative to second base station 20 and second base station 20 will inform first base station 20, for example through a land line backhaul network (not shown), as to the reception quality second base station 20 experienced and first base station 20 will forward this information to the subscriber station 24.

Figure 7:
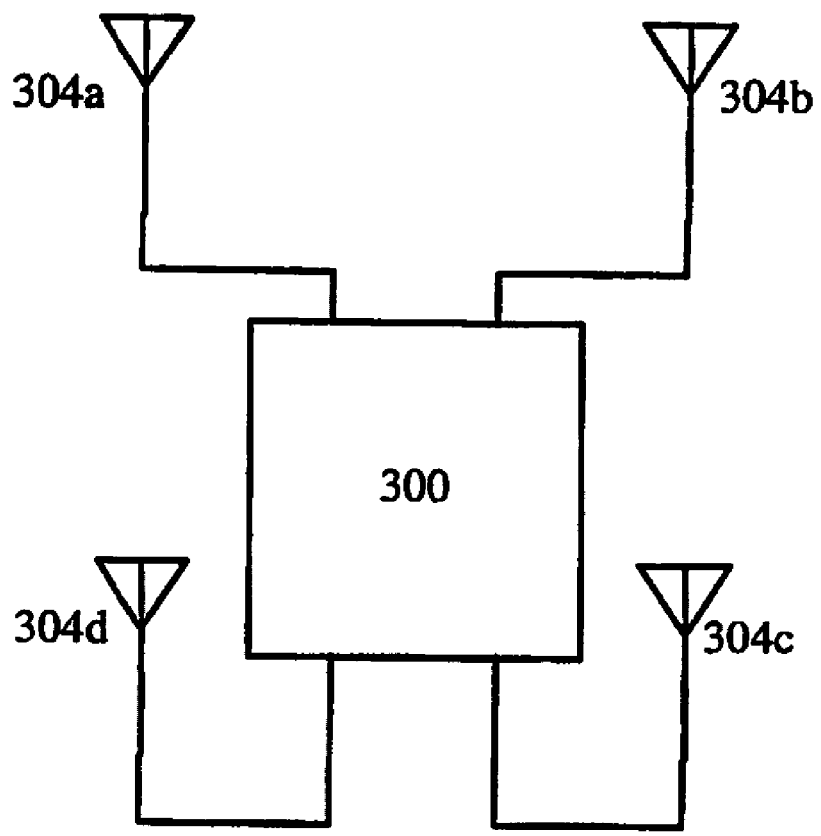
FIG. 7 shows a transceiver having another antenna diversity mechanism in accordance with an embodiment of the present invention.

FIG. 7 shows another embodiment of a subscriber station 300 in accordance with the present invention. In this embodiment, instead of having an antenna diversity mechanism 32 comprising a steerable antenna 34, the antenna diversity mechanism 34 comprises multiple spaced antennas 304 at subscriber station 300, each antenna 304 located at least ½ a wavelength of the radio signal from each other antenna 304. Subscriber station 24 includes a suitable controller to select a configuration comprising one of the multiple antennas 304 for transmission and/or reception. In another alternative, each antenna is a directional antenna and is or can be aimed in a different direction than each other antenna 304 in addition to being spaced from them as with the first alternative.

As with the steerable embodiments described above, in the embodiment of FIG. 7 one of antennas 304 is selected for reception and/or transmission. Specifically, the antenna 304 which has the best reception quality, compared to the other antennas 304, is determined at appropriate intervals and that antenna is then selected for reception until the next interval. In FDD embodiments, the antenna 304 which has the best transmission quality is also determined at appropriate intervals and that antenna 304 is then selected for transmission until the next interval.

The above-described embodiments of the invention are intended to be examples of the present invention and alterations and modifications may be effected thereto, by those of skill in the art, without departing from the scope of the invention which is defined solely by the claims appended hereto.

TABLE 1

| Sector | Reception Quality |
|--------|-------------------|
| 48i    | 57                |
| 48j    | 48                |

TABLE 1-continued

| Sector | Reception Quality |
|--------|-------------------|
| 48k    | 39                |
| 48m    | 41                |

TABLE 2

| Sector | Reception Quality |
|--------|-------------------|
| 48i    | 57                |
| 48j    | 37                |
| 48k    | 39                |
| 48m    | 41                |

TABLE 3

| Sector | Reception Quality5 |
|--------|--------------------|
| 48i    | 57                 |
| 48j    | 37                 |
| 48k    | 39                 |
| 48m    | 59                 |

TABLE 4

| Sector | Reception Quality |
|--------|-------------------|
| 48i    | 22                |
| 48j    | 37                |
| 48k    | 39                |
| 48m    | 59                |

We claim:

1. A system for transmitting and receiving a radio signal with a slotted frame structure, said system comprising:
    a first transceiver operable to transmit said radio signal;
    a second transceiver operable to receive said radio signal from an initial antenna configuration selected from a plurality of possible antenna configurations via antenna diversity;
    where said second transceiver can make a determination of reception quality for said radio signal from at least one alternative antenna configuration selected from said plurality of possible antenna configurations during the reception of a slot containing data from said first transceiver in said initial antenna configuration;
    where said second transceiver can make a selection of an antenna configuration to receive said radio signal from between said initial antenna configuration and said at least one alternative antenna configuration;
    where said selection of said alternative antenna configuration is made based upon a history of reception qualities achieved from each of said plurality of possible antenna configurations that have occurred at said second transceiver;
    where said selection of said alternative antenna configuration is made using a combination of random selection and historical selection; and
    where of one of said random selection and said historical selection is chosen based upon the rate of fading experienced at said second transceiver.

2. The system of claim 1, where said determination of reception quality is made after a regular time period.

3. The system of claim 2, where said regular time period occurs at least once over the duration of a slot.

4. The system of claim 1, where said determination of reception quality is made whenever reception quality drops below a minimum threshold level.

5. A system for transmitting and receiving a radio signal with a slotted frame structure, said system comprising:
- a first transceiver operable to transmit said radio signal;
- a second transceiver operable to receive said radio signal from an initial antenna configuration selected from a plurality of possible antenna configurations via antenna diversity;
- where said second transceiver can make a determination of reception quality for said radio signal from at least one alternative antenna configuration selected from said plurality of possible antenna configurations during the reception of a slot containing data from said first transceiver in said initial antenna configuration;
- where said second transceiver can make a selection of an antenna configuration to receive said radio signal from between said initial antenna configuration and said at least one alternative antenna configuration; and
- where said determination of reception quality is made at variable intervals, with said variable interval being determined by the rate of fading experienced at said second transceiver.

6. A system for transmitting and receiving a radio signal with a slotted frame structure, said system comprising:
- a first transceiver operable to transmit said radio signal;
- a second transceiver operable to receive said radio signal from an initial antenna configuration selected from a plurality of possible antenna configurations via antenna diversity;
- where said second transceiver can make a determination of reception quality for said radio signal from at least one alternative antenna configuration selected from said plurality of possible antenna configurations during the reception of a slot containing data from said first transceiver in said initial antenna configuration;
- where said second transceiver can make a selection of an antenna configuration to receive said radio signal from between said initial antenna configuration and said at least one alternative antenna configuration;
- where said second transceiver can transmit to said first transceiver using a different antenna configuration than the antenna configuration used for reception;
- where said second transceiver determines a transmission antenna configuration based upon information received from said first transceiver during reception of said radio signal, where said information indicates reception quality at said first transceiver; and
- where said second transceiver can transmit to a third transceiver while receiving said radio signal from said first transceiver.

7. The system of claim 6, where said second transceiver determines which of said first transceiver and said third transceiver to transmit to based upon information received from said third transceiver via said second transceiver.

8. The system of claim 7, where said second transceiver determines which of said first transceiver and said third transceiver to transmit to based upon a history of transmission qualities achieved for each of said first and third transceivers.

* * * * *